Patented Mar. 31, 1953

2,633,462

UNITED STATES PATENT OFFICE 2,633,462

COMPLEX COPPER COMPOUNDS OF DISAZO DYESTUFFS

Fritz Kehrer and Walter Wehrli, Basel, Switzerland, assignors to Sandoz A. G., Basel, Switzerland, a Swiss firm No Drawing. Application May 23, 1951, Serial No. 227,934. In Switzerland May 26, 1950

4 Claims. (Cl. 260—148)

The present invention relates to complex copper compounds of disazo dyestuffs.

An important consideration in the preparation of new dyestuffs which are to be applied to the fiber to be dyed from the dyebath, is their capacity for drawing onto the said fiber. Maximum exhaustion from the dyebath is a manifest desideratum from the standpoint of the economic value of the dyestuffs.

A primary object of the present invention is to provide disazo dyes which, in addition to other valuable properties such as the production of vivid shades of good fastness to light, are characterized by a very good drawing or exhausting capacity—particularly onto cotton and regenerated cellulose fibers—whereby substantially complete exhaustion of the dyebaths may be attained.

This object is realized according to the present invention which provides a group of cupriferous disazo dyestuffs which, dyeing cotton and regenerated cellulose fibers in bright Bordeaux shades, fulfil the aforesaid requirements.

These cupriferous disazo dyestuffs of the present application are obtained by coupling 1 mol of the compound of the formula

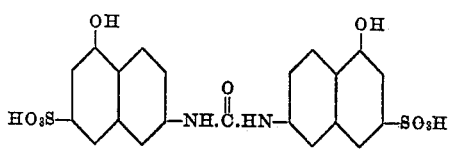

i. e. the symmetrical urea of 2-amino-5-hydroxy-naphthalene-7-sulfonic acid, on the one hand with the diazo compound from 1 mol of an aminobenzene-sulfonic acid of the formula

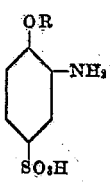

wherein R stands for hydrogen or methyl, and on the other hand with 1 mol of a diazotized aminobenzene sulfonic acid amide derivative of the formula

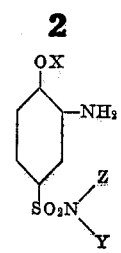

wherein X stands for hydrogen or methyl, Y stands for hydrogen or alkyl, and Z stands for hydrogen, alkyl, phenyl or substituted phenyl—the couplings being effected in either order of succession—and then treating the obtained disazo dyestuff with a copper-yielding agent.

The resultant products are the complex copper compounds of the dyestuffs of the formula

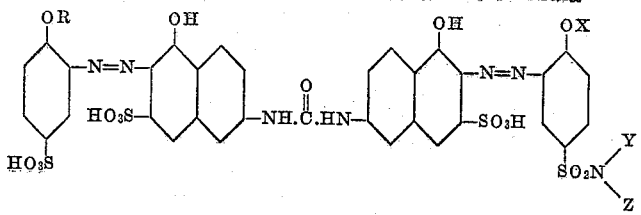

wherein R, X, Y and Z have the previously-recited significances.

More specifically, the new cupriferous dyestuffs are prepared (a) by first preparing the monoazodyestuff from 1 mol of the diazotized aminobenzene-sulfonic acid derivative and 1 mol of the symmetrical urea of 2-amino-5-hydroxy-naphthalene-7-sulfonic acid and coupling this with 1 mol of a diazotized aminobenzene-sulfonic acid amide derivative, or (b) first preparing the monoazo dyestuff from 1 mol of the diazotized aminobenzene-sulfonic acid amide derivative and 1 mol of the symmetrical urea of 2-amino-5-hydroxynaphthalene-7-sulfonic acid and coupling this with 1 mol of the diazotized aminobenzene-sulfonic acid derivative, and then subjecting the disazo dyestuff obtained in either of these two ways to after-coppering in known manner. If the uncoppered disazo dyestuffs contain methoxy groups in ortho-positions to the azo bridges, the conversion into the complex copper compounds is effected according to known methods wherein the methoxy groups are split during the metallization.

The new dyestuffs, as afore-indicated, are characterized, in addition to good solubility, by very good drawing capacity, and dye cotton and regenerated cellulose fibers in bright Bordeaux-colored shades of very good fastness to light.

Aminobenzene-sulfonic acids which are used in preparing the said cupriferous disazo dyestuffs, according to this invention, are the 1-hydroxy- 2-aminobenzene-4-sulfonic acid and the 1-methoxy-2-aminobenzene-4-sulfonic acid. Aminobenzene-sulfonic acid amide derivatives which are used are, among others, 1 - hydroxy - 2 - aminobenzene - 4 - sulfonic acid amide,
1 - hydroxy - 2 - aminobenzene - 4 - sulfonic acid methylamide,
1 - hydroxy - 2 - aminobenzene - 4 - sulfonic acid ethylamide,
1 - hydroxy - 2 - aminobenzene - 4 - sulfonic acid propylamide,
1 - hydroxy - 2 - aminobenzene - 4 - sulfonic acid dimethylamide,
1 - hydroxy - 2 - aminobenzene - 4 - sulfonic acid diethylamide,
1 - hydroxy - 2 - aminobenzene - 4 - sulfonic acid methylethylamide,
1 - hydroxy - 2 - aminobenzene - 4 - sulfonic acid anilide,
1 - hydroxy - 2 - aminobenzene-4-sulfonic acid-N-methyl-anilide,
1 - hydroxy - 2 - aminobenzene-4-sulfonic acid-N-ethyl-anilide,
1 - hydroxy - 2 - aminobenzene-4-sulfonic acid-4'-methyl-anilide,
1 - hydroxy - 2 - aminobenzene-4-sulfonic acid-2'-methoxy-anilide,
1 - hydroxy - 2 - aminobenzene-4-sulfonic acid-3'-chloro-aniline, etc.

and the corresponding 1-methoxy-2-aminobenzene-4-sulfonic acid amide derivatives.

The following examples further illustrate the invention, the parts being parts by weight unless otherwise indicated. The term "soda" refers to sodium carbonate.

Example 1

18.9 parts of 1-hydroxy-2-aminobenzene-4-sulfonic acid are diazotized and then coupled with 50.4 parts of the symmetrical urea of 2-amino-5-hydroxynaphthalene-7-sulfonic acid in the presence of sodium bicarbonate. Upon completion of the formation of the monoazo dyestuff, the latter is reacted in soda-alkaline medium with the diazo compound of 26.4 parts of 1-hydroxy-2-aminobenzene-4-sulfonic acid anilide. The diazo dyestuff, which corresponds to the formula

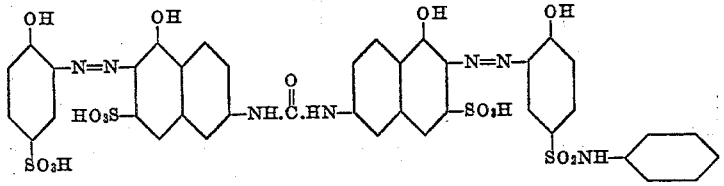

is isolated, and converted into the corresponding complex copper compound by treatment with copper sulfate according to the coppering method described in U. S. Patent 2,472,965, Example 1. The thus obtained cupriferous diazo dyestuff draws very well onto cotton and fibers of regenerated cellulose, substantially completely exhausting the dyebath, and dyes these textile materials in bright Bordeaux-colored shades of very good fastness to light.

Example 2

26.4 parts of 1-hydroxy-2-aminobenzene-4-sulfonic acid anilide are diazotized and coupled in the presence of sodium bicarbonate with 50.4 parts of the symmetrical urea of 2-amino-5-hydroxynaphthalene-7-sulfonic acid. Upon completion of the formation of the monoazo dyestuff, the latter is reacted in soda-alkaline medium with the diazo compound of 18.9 parts of 1-hydroxy-2-aminobenzene-4-sulfonic acid. The isolated disazo dyestuff is identical with that obtained according to Example 1. It is converted into the identical complex copper compound described in Example 1, in the manner therein set forth.

Example 3

The same cupriferous disazo dyestuff as that obtained according to Examples 1 and 2 can be obtained by replacing the diazo components set forth in these examples by equivalent quantities of:

1-methoxy-2-aminobenzene-4-sulfonic acid and 1-methoxy-2-aminobenzene-4-sulfonic acid anilide, or
1-hydroxy-2-aminobenzene-4-sulfonic acid and 1-methoxy-2-aminobenzene-4-sulfonic acid anilide, or
1-methoxy-2-aminobenzene-4-sulfonic acid and 1-hydroxy-2-aminobenzene-4-sulfonic acid anilide, while otherwise proceeding as described in the said examples, and then subjecting the thus-obtained disazo dyestuff to a demethylating coppering treatment with ammoniacal copper oxide according to the coppering method described in U. S. Patent 2,529,527, Example 1.

The conversion into the complex copper compound of the diazo dyestuff can, moreover, be accomplished by any of the known methods of metallization with concomitant splitting off the methoxy group or groups, as is well known in this art.

Example 4

29.2 parts of 1-hydroxy-2-aminobenzene-4-sulfonic acid-N-ethyl anilide are diazotized and coupled with 50.4 parts of the symmetrical urea of 2-amino-5-hydroxynaphthalene-7-sulfonic acid in the presence of sodium bicarbonate. Upon completion of the formation of the monoazo dyestuff, the latter is coupled in soda-alkaline medium with the diazo compound from 20.8 parts of 1-methoxy-2-aminobenzene-4-sulfonic acid. The disazo dyestuff, which corresponds to the formula

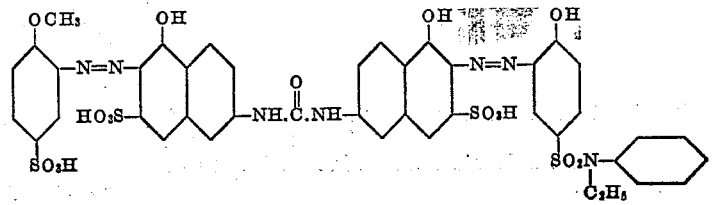

is isolated and converted into the corresponding complex copper compound by treatment with ammoniacal copper oxide. The thus-obtained cupriferous dyestuff draws very well onto cotton and regenerated cellulose fibers, substantially completely exhausting the dyebath, and dyes these textile materials in bright Bordeaux-colored shades of very good fastness to light.

*Example 5*

20.3 parts of 1-methoxy-2-aminobenzene-4-sulfonic acid are diazotized and then coupled with 50.4 parts of the symmetrical urea of 2-amino-5-hydroxynaphthalene-7-sulfonic acid in the presence of sodium bicarbonate. After completion of the formation of the monoazo dyestuff, it is coupled in soda-alkaline medium with the diazo compound from 20.2 parts of 1-methoxy-2-aminobenzene-4-sulfonic acid amide. The disazo dyestuff, which corresponds to the formula

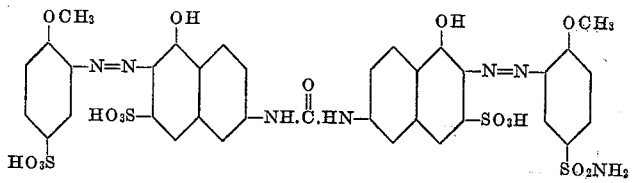

is isolated and converted into the corresponding complex copper compound by treatment with ammoniacal copper oxide. The thus-obtained cupriferous dyestuff draws very well onto cotton and regenerated cellulose fibers, substantially completely exhausting the dyebath, and dyes these textile materials in bright Bordeaux-colored shades of very good fastness to light.

*Example 6*

Cupriferous disazo dyestuffs with similar properties are obtained by replacing the aminobenzene-sulfonic acid amide derivative used in Examples 1 and 2 by any one of the following, and otherwise proceeding according to the prescriptions set forth in either of the said examples:

(a) 18.8 parts of 1-hydroxy-2-aminobenzene-4-sulfonic acid amide, or
(b) 20.2 parts of 1-hydroxy-2-aminobenzene-4-sulfonic acid methylamide, or
(c) 21.6 parts of 1-hydroxy-2-aminobenzene-4-sulfonic acid ethylamide, or
(d) 23.0 parts of 1-hydroxy-2-aminobenzene-4-sulfonic acid propylamide, or
(e) 21.6 parts of 1-hydroxy-2-aminobenzene-4-sulfonic acid dimethylamide, or
(f) 24.4 parts of 1-hydroxy-2-aminobenzene-4-sulfonic acid diethylamide, or
(g) 23.0 parts of 1-hydroxy-2-aminobenzene-4-sulfonic acid methylethylamide,
(h) 27.8 parts of 1-hydroxy-2-aminobenzene-4-sulfonic acid-N-methyl-anilide, or
(i) 27.8 parts of 1-hydroxy-2-aminobenzene-4-sulfonic acid-4'-methyl-anilide, or
(j) 29.4 parts of 1-hydroxy-2-aminobenzene-4-sulfonic acid-2'-methoxy-anilide, or
(k) 29.9 parts of 1-hydroxy-2-aminobenzene-4-sulfonic acid-3'-chloro-anilide.

The formulae of the unmetallized disazo dyestuffs of representative members of this example are as follows:

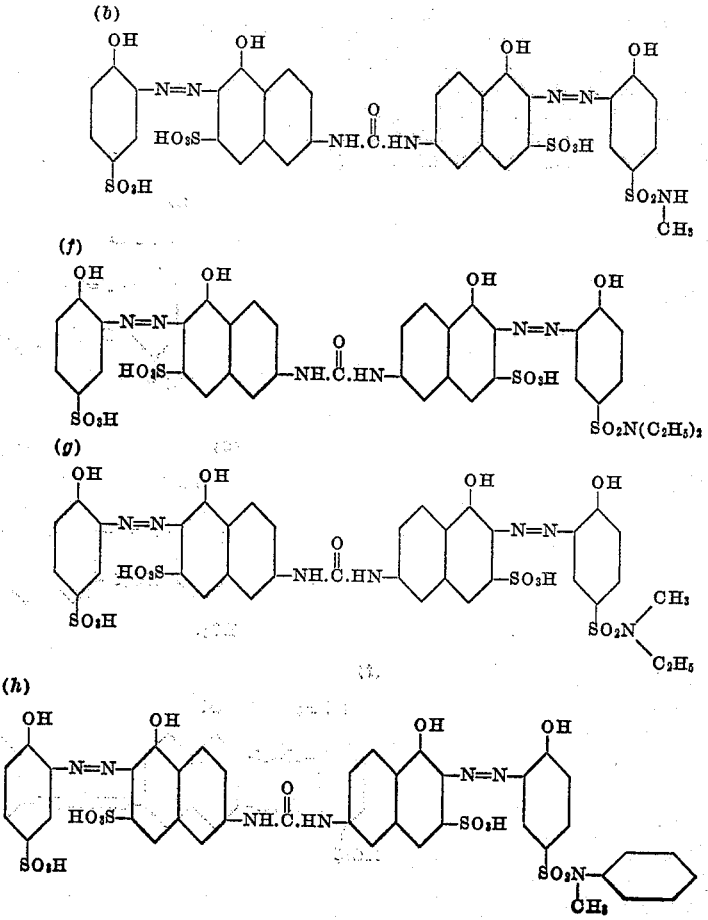

(i)
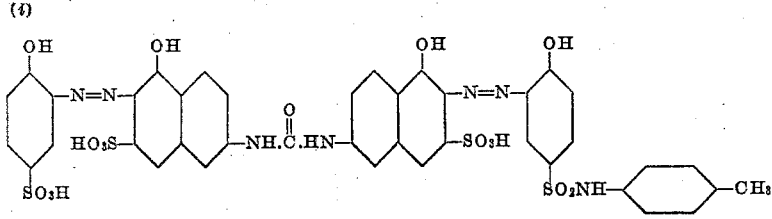

(j)
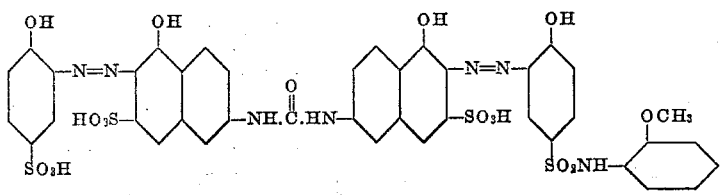

(k)
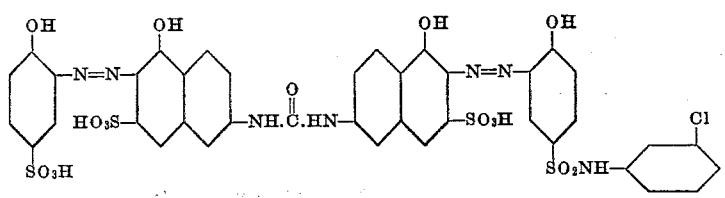

Example 7

Cupriferous disazo dyestuffs with similar properties are obtained by replacing the aminobenzene-sulfonic acid amide derivative used in Example 4 or Example 5 by any one of the following, and otherwise proceeding according to the prescriptions set forth in either of the said examples:

(l) 21.6 parts of 1-methoxy-2-aminobenzene-4-sulfonic acid methylamide, or (m) 23.0 parts of 1-methoxy-2-aminobenzene-4-sulfonic acid ethylamide, or (n) 24.4 parts of 1-methoxy-2-aminobenzene-4-sulfonic acid propylamide, or (o) 23.0 parts of 1-methoxy-2-aminobenzene-4-sulfonic acid dimethylamide, or (p) 25.8 parts of 1-methoxy-2-aminobenzene-4-sulfonic acid diethylamide, or (q) 24.4 parts of 1-methoxy-2-aminobenzene-4-sulfonic acid methylethylamide, or (r) 29.2 parts of 1-methoxy-2-aminobenzene-4-sulfonic acid-N-methyl-anilide, or (s) 30.6 parts of 1-methoxy-2-aminobenzene-4-sulfonic acid-N-ethyl-anilide, or (t) 29.2 parts of 1-methoxy-2-aminobenzene-4-sulfonic acid-4'-methyl-anilide, or (u) 30.8 parts of 1-methoxy-2-aminobenzene-4-sulfonic acid-2'-methoxy-anilide, or (v) 31.3 parts of 1-methoxy-2-aminobenzene-4-sulfonic acid-3'-chloro-anilide.

The formulae of the unmetallized diazo dyestuffs of representative members of this example are as follows:

(n)
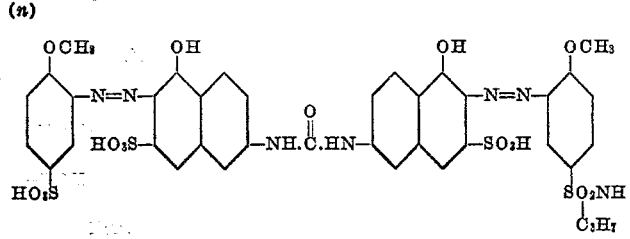

(o)
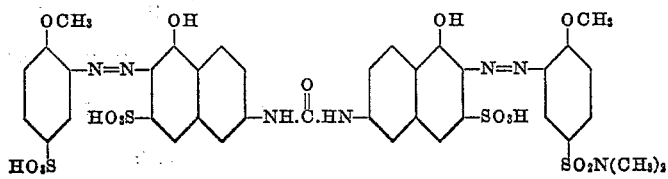

(t)
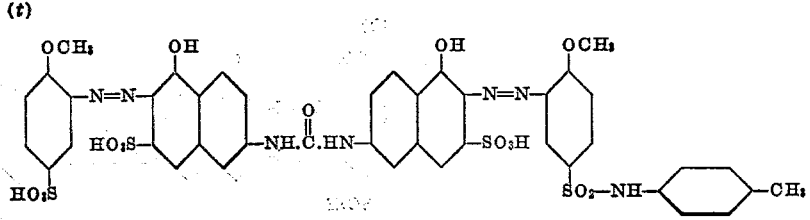

(u) 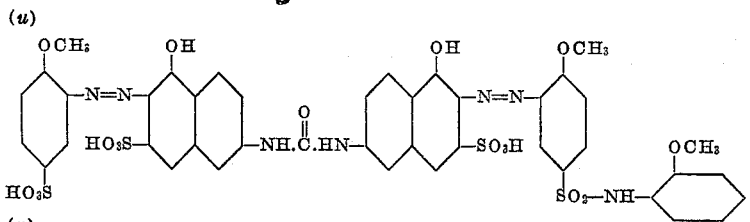

(v) 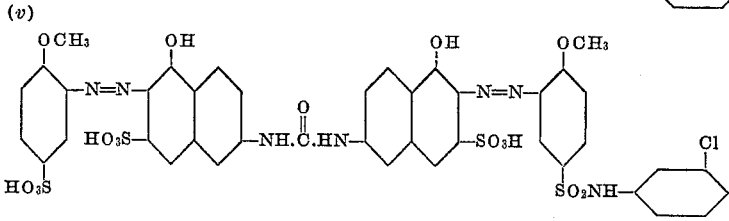

*Example 8*

100 parts of well wetted cotton are entered at 60° C. into a dye-bath containing in 3000 parts of water 0.5 part of the dyestuff described in Example 5 and 10 parts of Glauber's salt. The temperature is raised to the boil within ¾ of an hour, and then 10 parts of Glauber's salt are added. The dye-bath is kept boiling during 15 minutes. After the further addition of 10 parts of Glauber's salt the bath is allowed to cool to about 50° C. The cotton is then well rinsed and dried. It is dyed in a bright Bordeaux-colored shade of very good fastness to light.

Having thus disclosed the invention, what is claimed is:

1. A complex copper compound of a disazo dyestuff corresponding to the formula

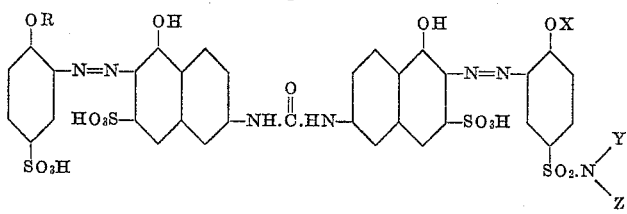

in which R and X each stands for a member selected from the group consisting of hydrogen and methyl, Y stands for a member selected from the group consisting of hydrogen and lower alkyl, and Z stands for a member selected from the group consisting of hydrogen, lower alkyl and mono-nuclear aryl.

2. The complex copper compound of the disazo dyestuff corresponding to the formula

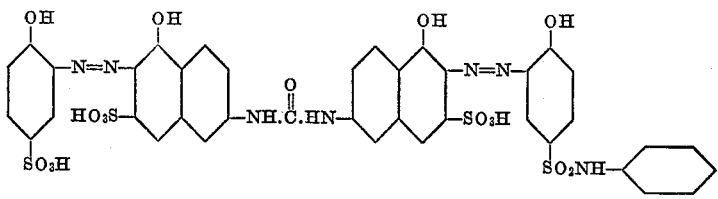

3. The complex copper compound of the disazo dyestuff corresponding to the formula

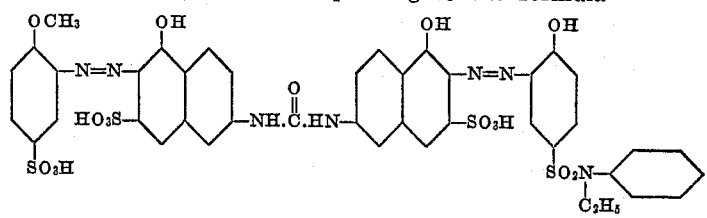

4. The complex copper compound of the disazo dyestuff corresponding to the formula

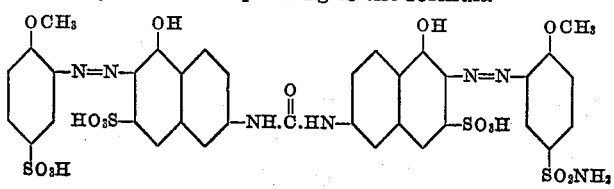

FRITZ KEHRER.
WALTER WEHRLI.

REFERENCES CITED

The following references are of record in the file of this patent:

UNITED STATES PATENTS

| Number | Name | Date |
|---|---|---|
| 2,467,621 | Kaiser et al. | Apr. 19, 1949 |
| 2,538,568 | Kaiser et al. | Jan. 16, 1951 |